United States Patent [19]

Payne

[11] Patent Number: 4,955,759

[45] Date of Patent: Sep. 11, 1990

[54] DITCH LINING APPARATUS AND METHOD AND PRODUCT THEREFROM

[76] Inventor: Le Roy Payne, 3300 Nicholas Ln., Molt, Mont. 59057

[21] Appl. No.: 389,960

[22] Filed: Aug. 7, 1989

Related U.S. Application Data

[62] Division of Ser. No. 235,205, Aug. 23, 1988, Pat. No. 4,872,784.

[51] Int. Cl.$^5$ ............................................. E02B 3/12
[52] U.S. Cl. ..................................... 405/270; 156/550; 405/258
[58] Field of Search ................. 405/270, 258, 52, 128, 405/129, 38, 268; 156/71, 550, 549, 552, 547, 577–579

[56] References Cited

U.S. PATENT DOCUMENTS

| | | | |
|---|---|---|---|
| 2,771,745 | 11/1956 | Bramble | 405/270 |
| 3,113,435 | 12/1963 | Yount | 405/270 |
| 3,160,512 | 12/1964 | Cash et al. | 405/270 X |
| 3,432,378 | 3/1969 | Huss | 156/499 X |
| 3,474,625 | 10/1969 | Draper et al. | 405/270 |
| 4,071,384 | 1/1978 | Eigenmann | 156/499 X |
| 4,073,152 | 2/1978 | Kishitani et al. | 405/270 X |
| 4,828,432 | 5/1989 | Ives | 405/270 |

*Primary Examiner*—Dennis L. Taylor
*Attorney, Agent, or Firm*—Arthur L. Urban

[57] ABSTRACT

Mobile continuous ditch lining apparatus includes a supporting portion, a raw material supplying portion, a mixing portion, a mixture delivery portion, a matrix forming portion and a control portion. The supporting portion includes at least one base section with a carriage. The raw material supplying portion includes a plurality of reservoirs connected independently with the mixing portion through flexible conduits. A blanket support extends from the supporting portion. The mixing portion includes an elongated chamber with a plurality of deflector sections. The matrix forming portion includes elongated mixture delivery and pressure applying mechanisms. The control portion includes a pump, a valve and a flow monitor along the length of each conduit, a drive advancing a continuous porous blanket through the matrix forming portion and a programmable memory.

A method of forming a ditch liner includes dispensing continuously a solidifiable liquid mixture uniformly over a continuously moving porous blanket. Pressure is applied thereto to form a continuous matrix therein. The rate of advance of the blanket is coordinated with the flow rate of the liquid mixture and the pressure applied thereto. The resulting liner is laid into a ditch continuously while still deformable and conformed and set in the configuration thereof. Also, the product formed with the above apparatus and method.

10 Claims, 1 Drawing Sheet

U.S. Patent  Sep. 11, 1990  4,955,759
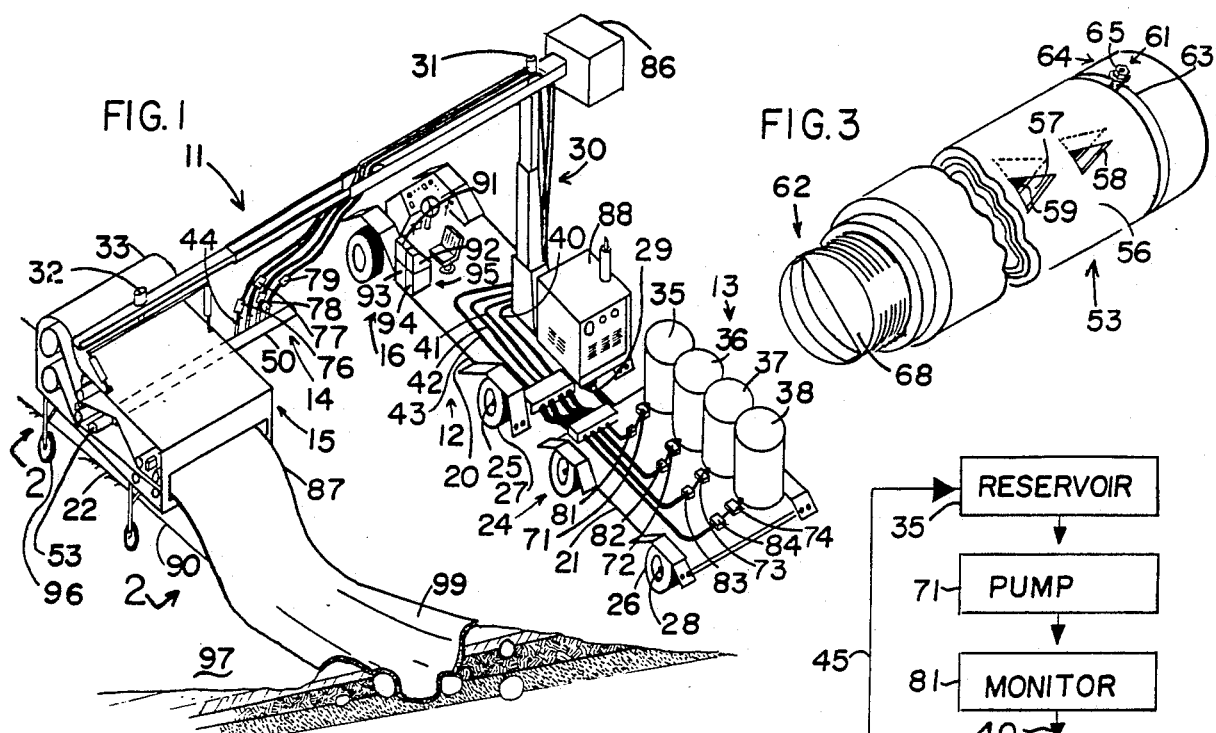
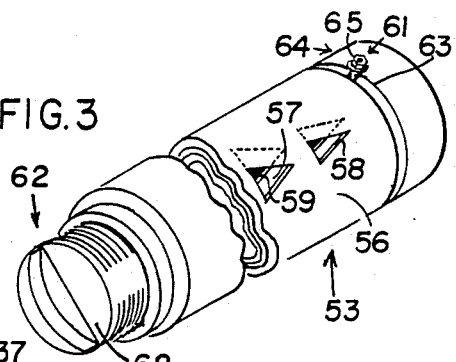
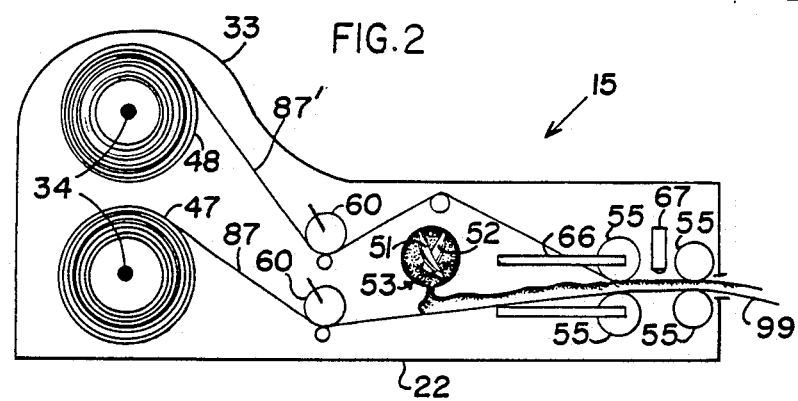
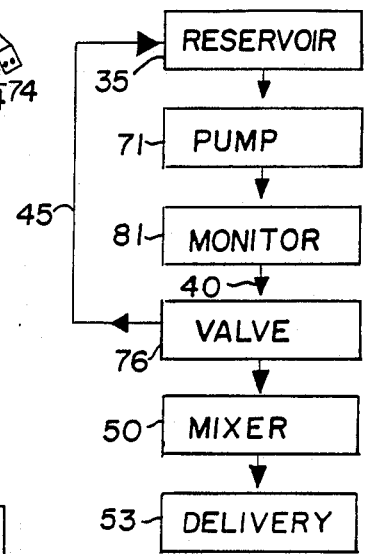
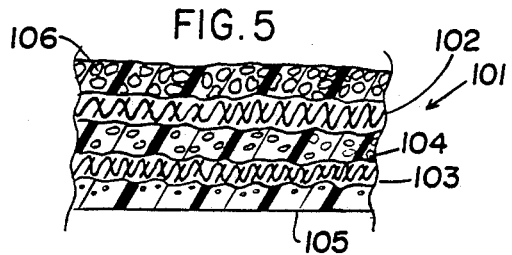
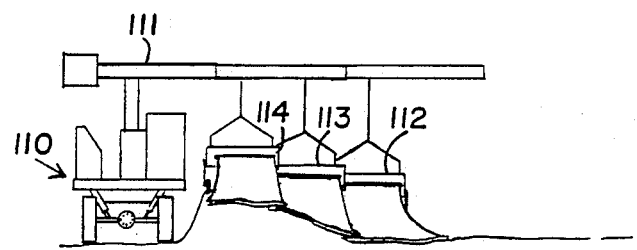
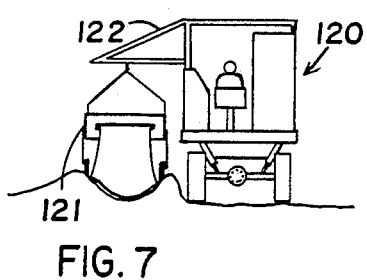
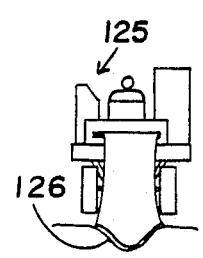
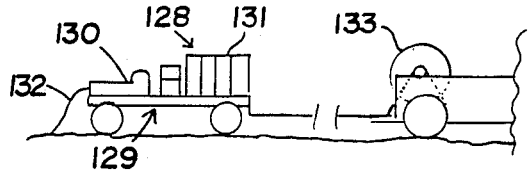

DITCH LINING APPARATUS AND METHOD AND PRODUCT THEREFROM

This application is a divisional of application Ser. No. 07/235,205, filed Aug. 23, 1988, now U.S. Pat. No. 4,872,784.

This invention relates to a novel mobile ditch lining apparatus and method and to a new continuous ditch liner produced therefrom.

In recent years, the management of natural resources has become important in many countries throughout the world. Efforts have been directed both toward the conservation of our resources and toward the elimination of pollution from our environment. Particular emphasis has been placed on waste leakage and water loss.

For example, losses in the distribution of water using unlined irrigation ditches are estimated at a minimum to be 25% and in some situations to be more than 50% depending upon the porosity of the ditch surface and the distance the water is being moved. In most rural areas, ditches are formed by excavating the soil to the desired depth and width. The water moves through the ditch in contact with the exposed natural surface. This can be sand, clay, rocks etc. and more commonly mixtures thereof. The porosity will depend upon the proportions of the different components.

While such ditches have been used in the past, the results were considered acceptable only because the supply of water exceeded the needs. However, as civilization developed and world population increased, more water was required for both greater food production and for the marked increase in non-agriculture uses. In addition to greater domestic uses in sanitation, industry now employs large quantities of water in manufacturing and processing procedures.

This high level of consumption plus the very high cost of developing new water supplies has shifted attention to water conservation. Domestic appliances that use less water have been developed. Also, industry has installed recycling purification systems to reduce water consumption.

Although conservation efforts have reduced water consumption to a degree, water still is in relatively short supply, particularly in recent years with the severe droughts in the United States and other countries. Since the most cost effective conservation opportunities and readily accessible water supplies already have been developed, greater attention must be directed to improving the efficiency of water distribution systems.

Some improvements in water distribution already have been made. A limited number of ditches and canals have been lined with placed concrete and/or preformed concrete pipes and other sections. Concrete is durable and has a long life when properly used. However, concrete is expensive to place and finish and is damaged by depressed temperatures during curing. Also, concrete is subject to frost damage, cracking and heaving which results in leaks.

PVC (polyvinylchloride) pipes and lined ditches also have been used to some extent in water distribution systems. PVC is less costly than concrete. The limited durability of PVC liners can be improved to a degree by burying it under several feet of soil. The soil holds the liner in place and cushions it against damage. However, both with concrete and PVC, considerable site preparation is required and after placement extra grading and filling frequently are needed to finish the job.

From the above discussion, it is clear that neither concrete nor PVC provide the desired ditch liner characteristics, that is, durability, low cost and easy placement. Thus, there is a need for a new ditch liner that provides these requirements.

The present invention provides a novel ditch lining apparatus, method and product which overcome the deficiencies of previous expedients. The invention not only overcomes the shortcomings, but also provides features and advantages not found in previous technology. The mobile ditch lining apparatus and method of the invention produce a uniform quality ditch liner continuously and quickly with a minimum of base preparation and a short downtime even at low temperatures. The ditch liner is formed and placed with little hand labor. With the apparatus and method of the invention, the structure and composition of the liner product can be modified along its length as desired automatically to provide special requirements for spillways, headgates, changes in direction and the like.

The mobile ditch lining apparatus of the present invention is simple in design and can be produced relatively inexpensively. Commercially available materials and components can be utilized in the manufacture of the apparatus. Conventional metal working fabricating procedures can be employed by semi-skilled labor in the manufacture of the apparatus.

Also, semi-skilled workmen can operate the ditch lining apparatus efficiently after a minimum of instruction. The apparatus is durable in construction and has a long useful life with little maintenance.

The apparatus and method of the invention can be modified to form a variety of different ditch liners. Variations in physical dimensions, and surface appearance and composition, etc. can be achieved quickly. Even with such variations, uniform quality of configuration and composition are maintained without difficulty.

These and other benefits and advantages of the novel mobile ditch lining apparatus, method and product of the present invention will be apparent from the following description and the accompanying drawings in which:

FIG. 1 is a view in perspective of one form of mobile continuous ditch lining apparatus of the invention;

FIG. 2 is an enlarged sectional view taken along line 2—2 of FIG. 1;

FIG. 3 is a fragmentary view in perspective of the mixture delivery means shown in FIG. 2;

FIG. 4 is a schematic illustration of a control portion of a mobile ditch lining apparatus of the invention;

FIG. 5 is an enlarged fragmentary cross-sectional view of a ditch liner of the invention shown in FIG. 1;

FIG. 6 is a front view of another form of mobile ditch lining apparatus of the invention;

FIG. 7 is a front view of a further form of mobile ditch lining apparatus of the invention;

FIG. 8 is a front view of an additional form of mobile ditch lining apparatus of the invention; and FIG. 9 is a side view of another form of mobile ditch lining apparatus of the invention.

As shown in FIGS. 1-3 of the drawings, one form of mobile continuous ditch lining apparatus 11 of the present invention includes a supporting portion 12, a raw material supplying portion 13, a mixing portion 14, a matrix forming portion 15 and a control portion 16.

The supporting portion 12 of the mobile ditch lining apparatus 11 of the present invention includes at least one base section 20 and advantageously more than one base section, shown as base sections 20, 21 and 22. Carriage means 24 depending from the base sections of the supporting portion 12 include at least one transverse axle assembly 25, 26 with wheels 27 and 28 mounted on free ends of each axle. Preferably, more than one of the base sections includes carriage means.

The base sections advantageously are selectively separable from one another through the use of conventional connectors such as hitches 29 and the like. Spatial adjustment also can be achieved with a cable and winch arrangement as shown in FIG. 9.

Preferably, one of the base sections is adjustably connected to another of the base sections, and most preferably providing adjustment with respect to both spacing and orientation. As shown in FIG. 1, ditch lining apparatus 11 includes a plurality of base sections 20, 21 and 22. Base sections 20 and 21 are interconnected by a conventional trailer hitch 29 and base sections 21 and 22 are adjustably interconnected through a telescoping boom 30 with a pivoting connection 31 and a second pivotable connection 32 adjacent the base section 22.

The base section 22 may be part of an enclosure such as pod 33 in which a number of components are located. As shown in FIG. 2, blanket support means 34 of raw material supplying portion 13, mixing portion 14 and matrix forming portion 15 are located within pod 33.

The raw material supplying portion 13 of the ditch lining apparatus 11 also includes a plurality of reservoirs 35, 36, 37 and 38 as required. The reservoirs may include resin components, catalysts, fillers, colors, other additives and the like. The reservoirs are connected independently with the mixing portion 14 through flexible conduit means 40, 41, 42 and 43.

Advantageously, the raw material supplying conduits 40–43 include quick connect means 44. The raw material supplying portion preferably also includes independent bypass return conduit means 45 extending from an end thereof adjacent the mixing portion back to the respective reservoirs as illustrated in FIG. 4.

The blanket support means 34 which extends from the supporting portion 12 advantageously accommodates a significant length of one or more continuous porous blankets shown as rolls 47 and 48 in a dispensing orientation. Suitable porous blankets include woven, knit, non-woven structures, etc. The blankets, e.g. fabrics, mats, etc. may be formed of continuous or discontinuous fibers, yarns, slit ribbons and the like. If desired, reinforcing members such as ropes, cables, scrims, etc. and the like that extend longitudinally and/or transversely of the blanket centerline may be included.

The mixing portion 14 of the ditch lining apparatus 11 of the invention includes an elongated chamber 50. The chamber 50 is mounted on the supporting portion 12 adjacent the blanket support means 34. A plurality of deflector sections 51 and 52 are disposed within the mixing chamber 50 spaced along the length of the chamber. The deflector sections 51 and 52 advantageously are angled with respect to a longitudinal axis of the elongated chamber.

The matrix forming portion 15 of the ditch lining apparatus 11 includes elongated mixture delivery means 53. The mixture delivery means is disposed closely adjacent to the mixing chamber 50. The mixture delivery means 53 is disposed substantially parallel to the blanket support means 34, that is, substantially perpendicular to the line of movement of the blanket through the portion 15.

The matrix forming portion 15 also includes pressure applying means 54 disposed adjacent the mixture delivery means 53. The pressure applying means advantageously includes at least one pair of cooperating aligned rollers 55. The matrix forming portion 15 preferably includes cutting means such as selectively rotatable blades 60. With the cutting means, the matrix forming portion may include roller translating means 66 facilitating movement of pressure applying rollers 55 close to the mixture delivery means 53 to grasp the free cut end of the blanket advancing from the cutting means. A sensor 67 is located within the pod 33 to detect the cut and start the translation of the rollers 55.

The mixture delivery means 53 of the matrix forming portion 15 preferably as shown in FIGS. 2 and 3 includes rotatable concentric tube members 56 and 57. Each tube member includes a plurality of openings 58 or 59 along the length thereof. The openings 58 along one tube member are located in the same pattern as the openings 59 along the other tube member. The mixture delivery means also may include orienting means 61 selectively matching the openings of the respective tube members and length adjusting means 62 disposed remote from an inlet of the delivery means 53.

As shown in FIGS. 2 and 3, the openings 58 and 59 of the concentric tube members 56 and 57 respectively advantageously are of a generally triangular configuration. The orienting means 61 preferably includes a transverse slot 63 in outer tube member 56. A pin 64 extending through slot 63 engages the inner tube member 57. With this arrangement, one of the tube members, e.g. 56 can be rotated with respect to the other e.g. 57 to change the overlapping of the openings 58 and 59 therein and thereby change the flow from the mixture delivery means 53. Locking of the relative positions of the tube members and thereby the size of the effective passages may be achieved with a threaded stud member 64 including a flange section 65 that can bear against the area surrounding the slot 63 to secure the tube members against movement.

The length adjusting means 62 advantageously may include a plug 68 preferably threadedly engaging a free end of the inner tube member 57. By changing the length of overlap therebetween, the effective length of the mixture delivery means 53 can be adjusted for particular liner widths.

The mixing portion 14 and the mixture delivery means 53 of the matrix forming portion 15 advantageously may be integrally formed as a unitary structure as shown in FIG. 1. The mixture delivery means preferably includes deflector sections 51 and 52 spaced along the length thereof.

The control portion 16 of the ditch lining apparatus of the invention includes a plurality of pumps, valves, sensors, monitors and the like. Advantageously, a pump 71, 72, 73 or 74; a valve 76, 77, 78 or 79; and a flow monitor 81, 82, 83 or 84 are located along the length of each conduit 40, 41, 42 and 43 respectively that extends between the raw material reservoirs 35–38 and the mixing chamber 50.

The control portion 16 also includes drive means 85. A first drive means 86 advances a continuous porous blanket 87 through the matrix forming portion 15. Advantageously, the control portion further includes second drive means 88 operating the supporting portion 12, both for the telescoping of boom 30 and for the movement of the ditch lining apparatus 11 alongside a ditch 90.

The pumps, valves, drives and other components are controlled by actuating means 91 that is responsive to information from the flow monitors and other sensors. The actuating means also is responsive to instructions from programmable memory means 92. The pumps, valves, drives etc. of the control portion preferably include electrical motors.

Advantageously, the control portion includes coordinating means 93, preferably including a process controller 94. The process controller initiates changes in the flows of materials and speeds of drives to bring variations therein back to the rates specified in the program present in the memory means. This coordination commonly is achieved through the transmission of information as digital pulses from the monitors and/or sensors at the components to the process controller 91. The operating information is compared with the preselected programming parameters stored in the memory. If differences are detected, instructions from the controller change the operation of the components to restore the forming operation to the preselected process specifications.

Novel continuous ditch liners of the present invention may be formed using the mobile apparatus 11 shown in FIGS. 1–3 employing the following steps of the method of the invention. The design of the ditch liner is established by reference to the topographical and soil conditions of the ditch base as well as the water distribution patterns desired. The process parameters for the particular ditch liner design being formed are programmed into the control portion 16 including memory 92 which may be a computer.

A minimum of ditch base preparation is required. With a new ditch, digging the ditch to the desired configuration usually is all that is necessary. With ditches that previously have been used in an unlined state, surface preparation is restoration to the configuration desired. In any case, the base preparation is much less than placing concrete mixes, PVC films, preformed concrete or PVC pipe sections, etc. Advantageously, the base includes a sufficient number of exposed rocks and the like to which the liner can be tightly bonded.

When the base is ready, the mobile ditch lining apparatus 11 is moved into position alongside ditch 90. Then appropriate buttons and/or switches on control panel 95 are depressed to activate the second drive 88 to move pod 33 into position over the ditch as shown in FIG. 1 by maneuvering boom 30. Also, depressible guide wheels 96 are extended into contact with ground surface 97.

The depression of the buttons and/or switches also has activated memory means 92, actuating means 91, coordinating means 93 and the other components of the control portion. The pumps 71–74, valves 76–79 and flow monitors 81–84 are energized in the preselected sequences of the memory. This causes the raw materials stored in reservoirs 35–38 to advance along the respective conduits 40–43 toward the mixing chamber 50. For example, to produce a foamed polyurethane resin matrix, reservoir 35 may contain an isocyanate, 36 a polyol, 37 a gas foaming agent and 38 a catalyst. Additional reservoirs (not shown) may contain fillers, colors, etc. as required.

The delivery of raw materials to the mixing chamber 50 will vary depending upon the particular formulation and quantity thereof required for a specific incremental area of the liner being formed at that moment. Although the flows through the conduits into the mixing chamber will vary, it is important that the raw materials entering the mixing chamber maintain a uniform quality. This can be accomplished by including for each conduit 40–43 a bypass 45 that extends from the end of the conduit adjacent the mixing chamber back to the respective reservoir.

The control portion 16 coordinates the operation of the various system components so the required formulation flows from the mixture delivery means 53 into the blanket 87 passing thereunder. If desired, at this point a second blanket can be combined therewith as shown in FIG. 2. The blanket then passes between pressure rollers 55 which compress the impregnated blanket to work the solidifiable mixture into the interstices for uniform distribution thereof to achieve a continuous matrix within the blanket. The resulting product is immediately laid into the ditch, the end secured in place and conformed with the configuration thereof before reaching the peak exotherm of the resin forming reaction taking place. In this state, the matrix is adhesive and tightly bonds the liner to the ditch base and particularly to the rocks, etc.

As the liner 99 is being laid continuously into the ditch, the pod 33 automatically is advanced along the ditch at the same rate. This can be done by advancing the entire apparatus 11 along the side of the ditch. More preferably, the base section 20 is moved along the ditch periodically and at each stop a section of liner is laid into the ditch by adjusting the boom and pivot connections to maintain continuously the alignment of the pod 33 with the ditch. When one liner section of the ditch is completed, the base section 20 is moved along the ditch and stopped again and the lining sequence repeated. In this way, the pod and liner easily can be aligned more precisely with the ditch.

The lining of a ditch according to the above method can be completed quickly with a minimum of base preparation. Also, areas along the length of the liner can be customized automatically to provide the features required for spillways, headgates, changes in direction and the like. The liner is permanently formed to the ditch configuration and is firmly anchored thereto. The liner is durable and resistant to damage from animals, people, etc. moving through the ditch. The liner also is resistant to damage from frost and settling of the base.

A lined ditch can be covered by making a second pass laying another blanket over the ditch. The formulation can be adjusted to provide faster curing of the blanket matrix. In some installations, it may be desirable to utilize a temporary support under the blanket cover such as a movable bladder or framework.

FIG. 5 illustrates an enlarged fragmentary cross-sectional view of the ditch liner shown in FIG. 1. The liner 101 includes two spaced blankets 102 and 103 with a continuous resin matrix 104 therethrough. The resin is foamed in place and has a dense lower skin surface 105 with pores 106 increasing in size and number toward the upper surface.

FIGS. 6–9 illustrate other forms of ditch lining apparatus of the invention. FIG. 6 shows a ditch lining apparatus 110 including a boom 111 with three pods 112, 113 and 114. The pods are arranged to provide succeeding overlapping blankets with pod 112 laying a blanket 116 in the bottom of a ditch 117. Pod 113 places a liner on the inclined side of the ditch and pod 112 a liner on the upper shoulder of the ditch. Liner sections on steep inclines may be pinned temporarily to hold them in place. Since the blankets are adhesive when positioned, the adjoining blankets adhere tightly to each other and form a continuous liner surface.

In FIG. 7, a ditch lining apparatus 120 has a pod 121 suspended from a cantileavered support 122. FIG. 8 shows a ditch lining apparatus 125 which straddles a ditch 126. A liner is deposited along a centerline of the apparatus. FIG. 9 illustrates a ditch lining apparatus 128 suitable for long straight ditches. A cart 129 including a pod 130 and a raw material supply 131 lays a liner 132 in a ditch as the cart is pulled forward with a cable and winch 133 positioned at the opposite end of the ditch.

The above description and the accompanying drawings show that the present invention provides a novel mobile ditch lining apparatus, method and product with features and advantages not known previously. The base surface requires a minimum of preparation before being lined. The lining can be placed at depressed temperatures not suitable for concrete placement. The ditch liner is formed and placed with a minimum of supervision and labor.

The configuration and composition of the liner can be modified along its length automatically to meet the requirements for spillways, headgates, changes in direction and the like. The liner is set in the configuration of the ditch and anchored to the underlying base. The liner is durable and has a long useful life with little maintenance.

The apparatus and method permit a large variety of liners to be produced. Changes from one design to another can be made easily and quickly.

It will be apparent that various modifications can be made in the particular ditch lining apparatus, method and product described in detail above and shown in the drawings within the scope of the present invention. The size, configuration and arrangement of components, steps and materials can be changed to meet specific requirements. For example, the number of components and reservoirs can be different. Also, the apparatus may include different drive, actuating and other components and mechanisms. These and other changes can be made in the ditch lining apparatus, method and product provided the functioning and operation thereof are not adversely affected. Therefore, the scope of the present invention is to be limited only by the following claims.

What is claimed is:

1. A method of continuously forming a ditch liner including the steps of flowing continuously a solidifiable liquid mixture uniformly simultaneously into an entire width of a continuously moving porous blanket, applying pressure against said liquid mixture and said blanket, working said liquid mixture into said blanket to form a continuous matrix within said blanket, monitoring the rate of advance of said blanket, coordinating said rate of advance with the flow rate of said liquid mixture into said blanket and the pressure applied thereto, laying the resulting liner into a ditch base continuously while deformable and said matrix is adhesive, conforming said liner to said ditch base, bonding said liner to said ditch base and setting said liner in the configuration thereof.

2. A method of continuously forming a ditch liner according to claim 1 wherein said porous blanket is formed of interconnected discontinuous fibers.

3. A method of continuously forming a ditch liner according to claim 2 wherein said porous blanket is a straw blanket rolled into a cylindrical bale.

4. A method of continuously forming a ditch liner according to claim 1 wherein said solidifiable liquid mixture is a thermosetting resin forming mixture.

5. A method of continuously forming a ditch liner according to claim 1 wherein the flow rates of components of said solidifiable liquid mixture are individually monitored prior to mixing.

6. A method of continuously forming a ditch liner according to claim 5 wherein said components are mixed by moving them through a mixing chamber along a tortuous path.

7. A method of continuously forming a ditch liner according to claim 1 wherein said solidifiable liquid mixture is capable of an exothermic reaction and said resulting liner is laid in said ditch base and conformed thereto before the mixture therein reaches its peak exothermic reaction.

8. A method of continuously forming a ditch liner according to claim 1 including the step of combining said mixture including blanket with a second porous blanket.

9. A method of continuously forming a ditch liner according to claim 1 including the step of combining said mixture including blanket with spaced longitudinal strength members.

10. A continuous ditch liner formed according to the method of claim 1.

* * * * *